United States Patent [19]
Farrell

[11] 3,837,776
[45] Sept. 24, 1974

[54] PRODUCT COOLING FOR BLOW MOLDING

[75] Inventor: John J. Farrell, Green Brook, N.J.

[73] Assignee: Farrell Patent Company, Dunellen, N.J.

[22] Filed: July 6, 1973

[21] Appl. No.: 377,052

[52] U.S. Cl............... 425/242 B, 425/209, 425/213
[51] Int. Cl............................................. B29d 23/03
[58] Field of Search.......... 425/DIG. 231, DIG. 209, 425/DIG. 204, DIG. 211, DIG. 213, DIG. 203, 242 B, 387 B, 324 B

[56] References Cited
UNITED STATES PATENTS

| | | | |
|---|---|---|---|
| 3,032,823 | 5/1962 | Sherman | 425/387 B |
| 3,100,913 | 8/1963 | De Matteo | 425/DIG. 209 |
| 3,450,805 | 6/1969 | Chesser | 425/156 X |
| 3,737,259 | 6/1973 | Valyi | 425/DIG. 209 |

*Primary Examiner*—Gil Weidenfeld
*Attorney, Agent, or Firm*—Sandoe, Hopgood & Calimafde

[57] ABSTRACT

A blow molding machine for making plastic articles has the plastic blown to the desired shape without requiring a blow mold cavity. A plastic coating is applied to a core rod which is covered by an expandible balloon, in deflated condition, hugging the core rod. The extent of expansion of the blown article is regulated by metering the amount of fluid used for blowing; and more accurate control can be obtained by using a liquid for blowing. A stream of air against the outside of the plastic cools the article. By making the wall of the balloon thicker at localized areas the expansion and consequent shape of the article can be controlled. If wide flat bottoms are desired, a baffle can be used for regulating the lengthwise expansion of the balloon and blown article.

14 Claims, 3 Drawing Figures

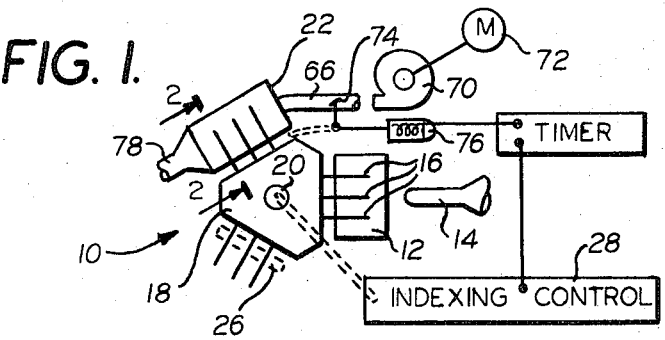
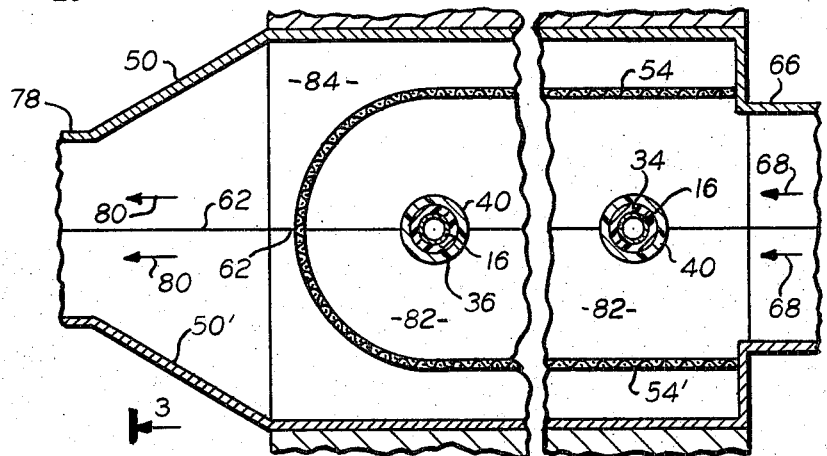
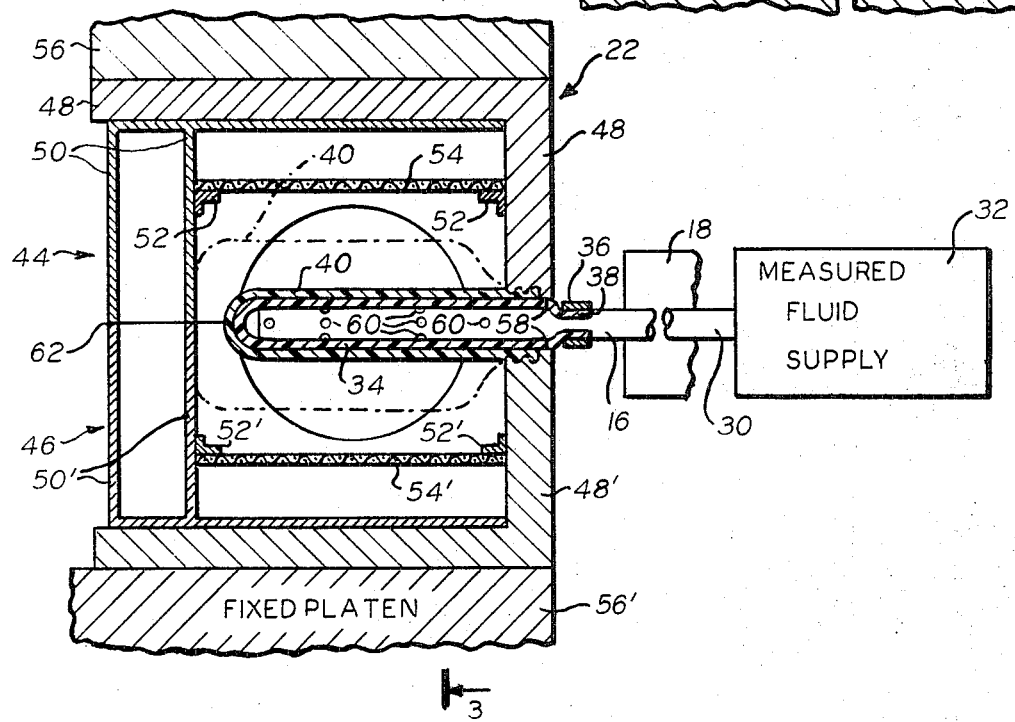

PRODUCT COOLING FOR BLOW MOLDING

RELATED APPLICATIONS

The invention of this specification is a further development of the blow molding invention described in my application Ser. No. 246,878, filed Apr. 24, 1972.

BACKGROUND AND SUMMARY OF THE INVENTION

In the blow molding apparatus of Ser. No. 246,878, core rods were covered with silicone rubber or other expansible material capable of withstanding high temperatures, and the expansion of plastic coated from the outside of the balloon was controlled to some extent by the design of the balloon so as to have greater wall thickness at some regions than at others. The thicker portions of the balloon would not expand as soon as the thinner portions and in this way the expansion of the plastic could be controlled so as to stretch those parts first which were over the thinner wall sections of the balloon and delay the stretching of other portions until the latter part of the blowing operation. In this way the direction in which portions of the blown article were stretched could be controlled and so could the thickness of the wall section of the blown article. However, the articles were blown in a cavity of a blowing mold.

The present invention dispenses with the necessity for a blowing mold. The articles are blown without requiring any confinement and the shape of the article depends upon the amount of blowing fluid introduced into the balloon and also upon the localized wall thickness of different portions of the balloon. Where the article is to have substantial increase in diameter during the blowing operation, the walls of the balloon are made thinner; and where the expansion of the article is to be less or not at all, the wall thickness of the balloon can be made to obtain as much resistance to expansion as necessary for the desired shape of the blown article.

In order to facilitate rapid cooling of the blown article, this invention provides for a stream of air or other gas, which may be refrigerated if desired, to withdraw heat from the blown plastic. A screened compartment is preferably provided for controlling air flow over the blown article.

In order to obtain a flat bottom on a blown container, where a flat bottom is desired, and to simplify the design of the balloon, a baffle can be used in the cooling chamber to limit the endwise expansion of the balloon without relying upon increased wall thickness and greater stiffness of that portion of the balloon which covers the end of a core rod.

Other objects, features and advantages of the invention will appear or be pointed out as the description procceds.

BRIEF DESCRIPTION OF DRAWING

In the drawing, forming a part hereof, in which like reference characters indicate corresponding parts in all the views:

FIG. 1 is a diagrammatic view of a blow molding machine having the features of this invention;

FIG. 2 is a greatly enlarged sectional view taken on the section line 2—2 of FIG. 1; and FIG. 3 is a sectional view taken on the line 3—3 of FIG. 2.

DESCRIPTION OF PREFERRED EMBODIMENT

A blow molding machine 10 has an injection mold 12 to which plastic is supplied by an injection nozzle 14. Core rods 16 extend into the cavities of the injection mold 12. These core rods 16 are supported by an indexing head 18 which rotates about a center post 20 to move the core rods 16 from the injection mold through a blowing compartment 22 which is angularly spaced from the injection mold 12 by angle of 120°.

After the blowing operation, the indexing head 18 turns to another angle of 120° to bring the core rods with the blown articles on them to a stripper 26. The blown articles are pushed off the core rods by the stripper 26 and the core rods are moved, on the next angular movement of the indexing head 18, to the injection mold 12 preparatory to the starting of a new cycle.

The operation of the injection nozzle 14, the opening and closing of the injection mold 12, the operation of the stripper 26 and the periodic angular movements of the indexing head are all conventional in blow molding apparatus and they are automatically controlled from control mechanism indicated diagrammatically by the block diagram designated by the reference character 28. The novelty of the structure shown in FIG. 1 is the substitution of the blowing compartment 22 in place of a conventional blowing mold. Other novelty involves the balloon coated core rods which are not illustrated in FIG. 1 because of the small scale but which will be described in connection with FIGS. 2 and 3.

FIG. 2 shows a portion of the indexing head 18 with one of the core rods 15 extending from the indexing head 18 toward the left in FIG. 2 and the core rod is shown in communication with tubing 30 which leads from a measured fluid supply device 32.

This measured fluid supply device 32 supplies fluid to the core rod 16 for blowing a balloon 34 which covers the core rod snugly and which is secured at one end to the core rod by a bushing 36 surrounding the neck of the balloon and holding the balloon clamped into a circumferential groove 38 in the core rod.

The plastic coating or parison 40 that is molded over the balloon 36 in the injection mold 12 (FIG. 2) is expanded to the shape indicated by the dot and dash lines in FIG. 2.

This blowing of the balloon 34 and parison 40 can be done by admitting a limited quantity of compressed air or other gas to the core rod 16 from the measured fluid supply device 32. The wall thickness or stiffness of the balloon 34 must be designed so that it blows to a generally cylindrical contour along most of its length instead of blowing to a spherical shape as is common with balloons having a uniform wall thickness and flexibility at all parts of their area.

Somewhat more accurate results can be obtained by using a liquid instead of a gas to blow the balloon 34 and parison 40. The advantage of the liquid is that it has a constant volume whereas the volume of a compressed gas depends upon the pressure and this requires a balancing of the force required to expand the balloon 34 and the pressure of the compressed air whereas a limited quantity of liquid will not expand the balloon 34 beyond the volume of the liquid, regardless of the back pressure on the liquid.

The blowing compartment consists of an upper section 44 and a lower section 46. The upper section 44 consists of a stiff frame 48 and sheet metal portions 50 attached to the frame 48 so that they move as a unit with the frame 48. There are angle brackets 52. One of these is on one of the sheet metal portions 50, and the other is secured to the downwardly extending portion of the frame 48. A screen 54 is attached to the angle brackets 52. The lower section 46 of the cooling compartment is of the same construction as the upper section but with opposite orientation; and the parts of the lower section are marked with the same reference characters as their corresponding parts of the upper section but with a prime appended.

The frame 48 of the upper section 44 is secured to a movable platen 56; and the lower section 46 is secured to a fixed platen 56'.

The removable platen 56 opens and closes the blowing compartment 22 in the same way as a mold opens and closes and this operation is in synchronism with the opening and closing of the injection mold so that the movement of the indexing head 18, and the core rods 16, occurs with the blowing compartment open and with the indexing head and core rods lifted to clear the lower section 46.

The upper and lower frames 48 and 48' have complementary recesses 58 which form an opening into the blowing compartment for receiving the core rods 16, balloon 34 and parison 44. These recesses 58 are shaped to correspond to the neck of the parison 40 as formed in the injection mold. In FIG. 2 this neck is shown as provided with threads for the top of the container which is the blown article produced by the blow molding apparatus of FIGS. 1-3.

The fluid for blowing the balloon 34 and parison 40 is discharged from within the core rods 16 through spaced openings 60 located at various places along the core rod, as shown in FIG. 2. At the end of each blowing operation, the fluid is withdrawn from the inside of the balloon 34 so that the balloon contracts again into contact with the core rods 16. Vent passages are provided for admitting air into the space between the balloon 34 and the blown parison 40 so that the blown article will not be collapsed by the development of a vacuum between the collapsing balloon 34 and the blown article. Such ventilation for the blown article is described in my balloon blow molding application referred to in the introduction of this specification.

FIG. 3 is a fragmentary sectional view on the line 3—3 of FIG. 2. Two core rods 16 are shown in FIG. 3 with a balloon 34 hugging each of the core rods 16, and with a plastic parison 40 coating the outside of the balloon 36. The screens 54 and 54' converge toward one another beyond the left hand core rod 16 and come together along a parting line 62 at which the upper and lower sections 44 and 46 come together when the blowing compartment is closed. At the opposite end of the space enclosed by the screens 54 and 54' there is an inlet conduit 66 through which air or other cooling gas flows, in the direction indicated by the arrows 68.

The supply of cooling gas through the conduit 66 can come from a centrifugal blower 70 (FIG. 1) driven continuously by a motor 72. There is a throttle valve 74 in the conduit 66 for shutting off substantially all air flow through the conduit at times when the core rods are first introduced into the cooling chamber and before the parisons have been blown.

When the blowing operation has been completed, or has progressed far enough so that no adverse effect will be caused by starting the cooling operation, a solenoid 76 is actuated to move the valve 74 into position to permit flow of the full delivery from the blower 70 into the blowing chamber 22.

Portions of the sheet metal 50 and 50' of the cooling chamber converge toward one another at the discharge end of the chamber to form an outlet conduit 78 along which air is discharged in the direction indicated by the arrows 80.

When the blowing compartment is closed, as shown in FIG. 3, the screens 54 and 54' form a first compartment 82 in which the gas is confined to some extent around the core rod 16. The gas escapes through the screens 54 and 54' into a second compartment 84 from which it discharges through the conduit 78.

The preferred embodiment of the invention has been illustrated and described but changes and modifications can be made and some features can be used in different combinations without departing from the invention as defined in the claims.

What is claimed is:

1. Plastics blow molding apparatus comprising a head and at least one core rod extending from the head, a coating station, means at said coating station for applying a coating of plastic material to said core rod, a blowing station, means at said blowing station for blowing the coating on said core rod into an article and means for limiting the size of the article being blown with a substantial portion of the outside surface of the article not being confined by a closed mold, said blowing station further including a chamber in which the coated core rod is located during the blowing operation and means for blowing fluid into said chamber and into direct contact with the outside surface of the plastic material for cooling same before the core rod and blown article are moved from the blowing position.

2. The plastics blow molding apparatus described in claim 1 characterized by a passage through which fluid is blown into the chamber.

3. The plastics blow molding apparatus described in claim 2 characterized by a blower for supplying fluid to the chamber, a timer for controlling the supplying of fluid to the chamber from the blower, and means for operating the timer in accordance with the delivery of a core rod to the chamber.

4. The plastics blow molding apparatus described in claim 3 characterized by the chamber being divided into two compartments, including a first compartment in which the coated core rod is located when at the blowing station, and a second compartment with a perforate partition separating it from the first compartment and having an exhaust outlet for rapid escape of fluid from the second compartment, the blower being in position to supply fluid to the first compartment, and the partition having its perforate area limited in size in proportion to the output of the blower so that the fluid pressure in the first compartment is substantially higher than that in the second compartment.

5. The plastics blow molding apparatus described in claim 4 characterized by the partition being a fine mesh wire screen.

6. The plastics blow molding apparatus described in claim 1 characterized by the means for limiting the size of the blown article being an apparatus that supplies a measured quantity of fluid to the core rod for blowing the coating on the core rod.

7. The plastics blow molding apparatus described in claim 6 characterized by the apparatus that supplies the measured quantity of fluid being a liquid metering device.

8. The plastics blow molding apparatus described in claim 6 characterized by an expandible jacket on the core rod and over which the coating of plastics material is applied, the core rod having openings therein through which the fluid flows into contact with the inside surface of the expandible jacket to blow the coating without having direct contact with the coating.

9. The plastics blow molding apparatus described in claim 1 characterized by a mold that holds the end portion of the coating on the core rod while the rest of the coating is blown, and means for moving a part of the mold with respect to another part to open the mold and release the end portion of the coating for movement of the core rod to another station.

10. The plastics blow molding apparatus described in claim 9 characterized by other structure connected with the mold parts for opening and closing movement therewith, said other structure forming the chamber at the blowing station around the core rod and the coating thereon, said chamber having an inlet opening through which fluid is blown into said chamber and an exit opening through which fluid escapes from the chamber, and means in the chamber for causing the fluid in the chamber to circulate around the outside surface of the blown article on the core rod.

11. The plastics blow molding apparatus described in claim 1 characterized by a cooled surface for confining the length to which the coating on the core rod can be blown, the sides of said coating being unconfined when the coating on the core rod is blown into contact with said cooled surface, and the means for blowing fluid being directed into contact with the unconfined sides of the blown article.

12. The plastics blow molding apparatus described in claim 11 characterized by the cooled surface being a thin metal partition to both sides of which fluid is supplied by said means for blowing fluid.

13. The plastics blow molding apparatus described in claim 1 characterized by the head being an indexing head having faces on different sides thereof to form a polygon, a plurality of core rods extending from each face, stations around the indexing head corresponding to the different sides of the polygon, an indexing control that moves the indexing head successively through angles corresponding to the angular spacing of said stations to shift the core rods progressively to successive stations, an injection mold at one station, the next station around the indexing head constituting the blowing station at which the coating on the core rod is blown and at which the fluid is blown into direct contact with the outside surface of the blown article while the article is still in the position in which it is blown, and means for controlling the cooling of the blown article at said blowing station including a blower and a timer controlling the amount of fluid supplied to the outside of the blown article.

14. The plastic blow molding apparatus described in claim 1 characterized by a plurality of core rods extending from said head.

* * * * *